Patented Feb. 17, 1942

2,273,322

UNITED STATES PATENT OFFICE 2,273,322

ORGANIC VULCANIZING AGENT

Paul C. Jones, Akron, Ohio, assignor to the B. F. Goodrich Company, New York, N. Y., a corporation of New York No Drawing. Application April 25, 1940, Serial No. 331,639

13 Claims. (Cl. 260—775)

This invention relates to the art of rubber manufacture and has as its chief object to provide a new and improved class of vulcanizing and accelerating agents.

The process of this invention consists in vulcanizing rubber in the presence of an amino azyl polysulfide. Although sulfur may be employed if desired, it is by no means necessary, and vulcanizates having good properties may be obtained by curing rubber in the presence of an amino azyl polysulfide without adding free sulfur and in the presence or absence of an organic accelerator.

The amino azyl polysulfides of this invention contain the general structural formula

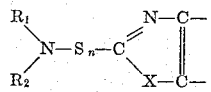

wherein

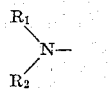

represents an aliphatic amino group, $n$ represents 2 or 3, and X represents —S—, —O—, or —NH—.

$R_1$ and $R_2$ may represent methyl, ethyl, isopropyl, amyl, 2-hydroxyethyl, 2-aminoethyl, methoxyethyl, cyclohexyl, ac-tetrahydronaphthyl, benzyl, p-methylbenxyl, or similar alkyl, aralkyl, or cycloalkyl groups. Either $R_1$ or $R_2$ may represent hydrogen, and $R_1$ and $R_2$ may together constitute a saturated carbon chain such as the pentamethylene group which may be interrupted by a —S—, —O—, or —NH— group.

The azyl portion of the compound is either thiazyl, oxazyl, or imidazyl depending upon the group represented by X. Azyl groups such as 4,5-dimethylthiazyl, 4,5-dimethyloxazyl, 4,5-dimethylimidazyl, 4-ethylthiazyl, 4-phenylthiazyl, 4,4-diethylthiazyl, benzothiazyl, naphthothiazyl, and similar groups may accordingly be present in the vulcanizing agents of this invention.

These compounds may be prepared by the method disclosed in my copending application Serial No. 331,638, filed April 25, 1940.

To illustrate the use of the accelerators of this invention, the following compositions were prepared:

|  | Composition | | | |
|---|---|---|---|---|
|  | 1 | 2 | 3 | 4 |
| Rubber | 100 | 100 | 100 | 100 |
| Zinc oxide | 5 | 5 | 5 | 5 |
| Stearic acid | 1 | 1 | 1 | 1 |
| Sulfur | 3 | 0 | 3 | 0 |
| Diethylamino 4,5-dimethylthiazyl trisulfide | 0.5 | 3 | 0 | 0 |
| Cyclohexylamino 4,5-dimethylthiazyl trisulfide | 0 | 0 | 0.5 | 3 |

These compositions were heated in a mold and produced vulcanizates having the following characteristics, T representing tensile strength in lbs./in.² and E representing ultimate elongation in per cent.

| Composition | Time of cure in min. | Temp. of cure, ° F. | T | E |
|---|---|---|---|---|
| 1 | 30 | 260 | 1,730 | 925 |
| 1 | 60 | 260 | 3,195 | 810 |
| 1 | 120 | 260 | 3,895 | 750 |
| 2 | 15 | 287 | 2,335 | 845 |
| 2 | 30 | 287 | 3,020 | 800 |
| 2 | 60 | 287 | 2,810 | 785 |
| 3 | 30 | 260 | 1,320 | 965 |
| 3 | 60 | 260 | 2,420 | 875 |
| 3 | 120 | 260 | 3,025 | 805 |
| 4 | 15 | 287 | 2,320 | 845 |
| 4 | 30 | 287 | 2,235 | 865 |
| 4 | 60 | 287 | 2,410 | 850 |

These accelerating and vulcanizing agents are particularly useful in cements, for they are soluble in gasoline and other rubber solvents. Vulcanizates prepared in the presence of the compounds of this invention, particularly when the amino azyl polysulfide is the sole accelerating and vulcanizing agent employed in the composition, exhibit unusually good resistance to aging.

It is to be understood that the specific examples given above are merely illustrative of one manner of the use of the accelerating and vulcanizing agents of this invention; that other materials within the scope of the class herein defined may be substituted for the specific compounds used in the examples; that the compounds of this invention may be used to vulcanize not only ordinary rubber or caoutchouc but also other similar materials which are capable of vulcanization when heated with sulfur, such as balata, gutta percha, synthetic rubber, or natural or artificially prepared latex, all of which are designated in the claims by generic expression "a rubber"; that the accelerators may be incorporated in the rubber by mastication or milling, or in the case of latex or other dispersion or solution, by simply dissolving or suspending the accelerator therein; that the compounds may be used in admixture with each other or with other known accelerators and vulcanizing agents or with antioxidants, organic acids, amines, softeners, activators, retarders, pigments, fillers, etc.; and that the rubber may be vulcanized with the assistance of this new class of compounds, in heated molds, hot air, steam, hot water, etc.

This invention is accordingly not limited to the specific examples herein set forth, for it will be obvious to those skilled in the art that many modifications such as using other materials having equivalent properties and varying the proportions of materials used are within the spirit and scope of the invention as defined in the appended claims.

I claim:

1. The method which comprises vulcanizing a rubber in the presence of a compound having the general structural formula

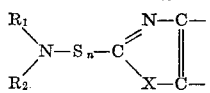

wherein

represents an aliphatic amino group, $n$ represents one of the integers 2 and 3, and X represents a member of the class consisting of —S—, —O—, and —NH—.

2. The method which comprises vulcanizing a rubber in the presence of a compound having the general structural formula

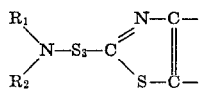

wherein

represents an aliphatic amino group.

3. The method which comprises vulcanizing a rubber in the presence of a dialkylamino thiazyl trisulfide.

4. The method which comprises vulcanizing a rubber in the presence of a dialkylamino thiazyl trisulfide as the sole vulcanizing agent in the composition.

5. The method which comprises vulcanizing a rubber in the presence of a dialkylamino thiazyl trisulfide as the sole vulcanizing and accelerating agent in the composition.

6. The method which comprises vulcanizing a rubber in the presence of diethylamino 4,5-dimethylthiazyl trisulfide.

7. The method which comprises vulcanizing a rubber in the presence of cyclohexylamino 4,5-dimethylthiazyl trisulfide.

8. A rubber which has been vulcanized in the presence of a compound having the general structural formula

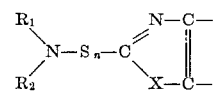

wherein

represents an aliphatic amino group, $n$ represents one of the integers 2 and 3, and X represents a member of the class consisting of —S—, —O—, and —NH—.

9. A rubber which has been vulcanized in the presence of a compound having the general structural formula

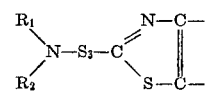

wherein

represents an aliphatic amino group.

10. A rubber which has been vulcanized in the presence of a dialkylamino thiazyl trisulfide.

11. A rubber which has been vulcanized in the presence of cyclohexylamino thiazyl trisulfide.

12. A rubber which has been vulcanized in the presence of diethylamino 4,5-dimethylthiazyl trisulfide.

13. A rubber which has been vulcanized in the presence of cyclohexylamino 4,5-dimethylthiazyl trisulfide.

PAUL C. JONES.